April 12, 1932.   C. B. WATSON   1,853,755
METHOD OF TREATING CRACKED HYDROCARBON VAPORS
Filed July 1, 1929
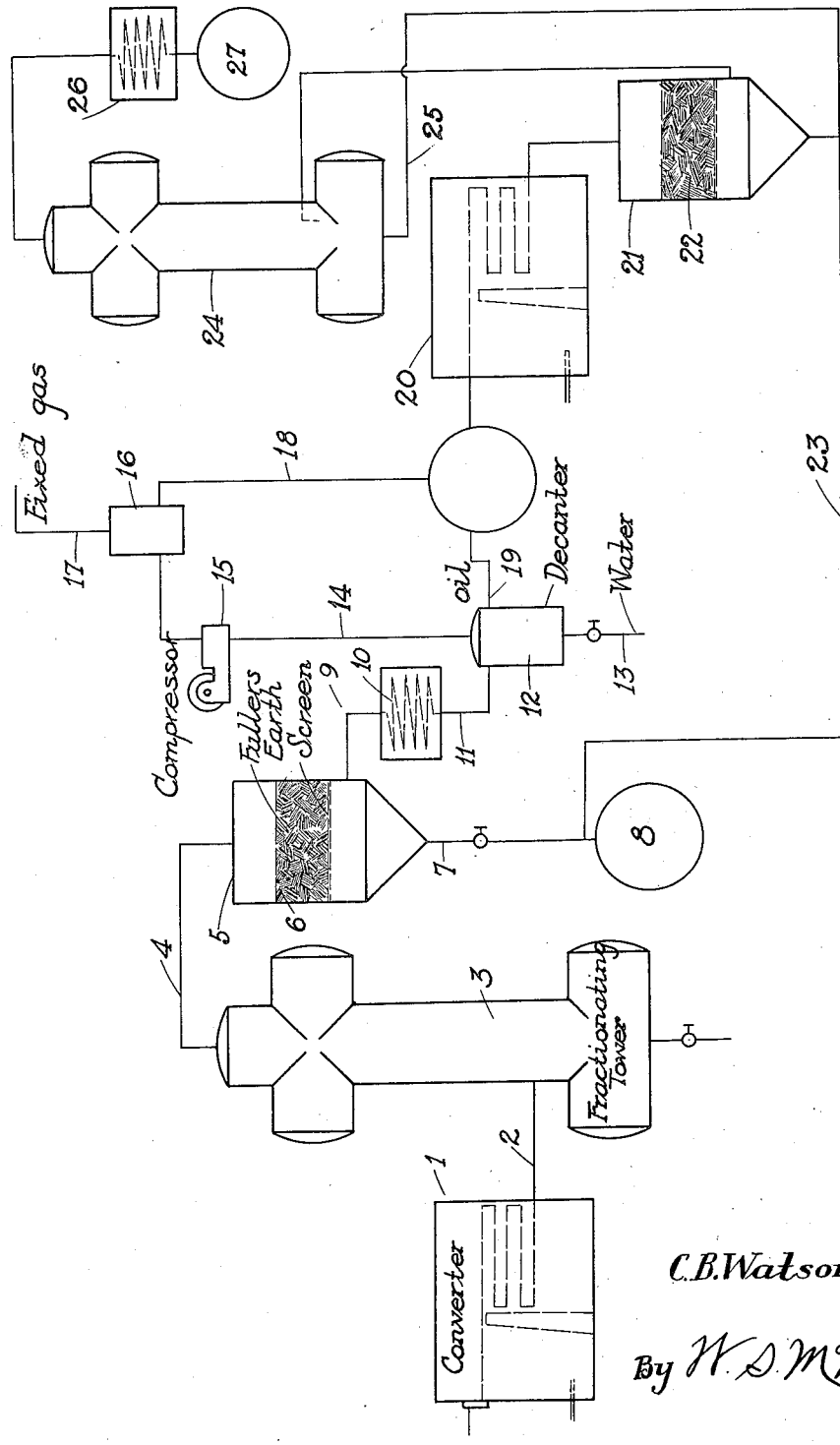

Patented Apr. 12, 1932

1,853,755

UNITED STATES PATENT OFFICE

CORNELIUS B. WATSON, OF CHICAGO, ILLINOIS, ASSIGNOR TO THE PURE OIL COMPANY, OF CHICAGO, ILLINOIS, A CORPORATION OF OHIO

METHOD OF TREATING CRACKED HYDROCARBON VAPORS

Application filed July 1, 1929. Serial No. 375,007.

This invention relates to the treatment of hydrocarbon vapors of the type which are produced by cracking processes wherein the oils undergoing pyrogenetic decomposition and in a vaporous state are subjected to cracking temperatures of the order of 1000° F. or higher.

Hydrocarbon products when produced by such methods and condensed provide low boiling compounds falling within the boiling range of gasolene and are well adapted to service as fuels for internal combustion engines. However, the vapors when discharged from the converters possess to a high degree unsaturated bodies, many of which are of such character that unless removed by appropriate treatment, the condensate formed therefrom would be unsuitable for use as a motor fuel due to the presence therein of gum-forming and also color-imparting bodies of a highly undesirable character.

The present invention, therefore, has for its principal object the provision of a method whereby the undesirable compounds present in cracked gasolene vapors may be effectively removed to produce a fuel characterized by its stability when being handled or stored and the absence therefrom of color-imparting and gum-forming bodies as well as other undesirable compounds which interfere with the value of the final condensed product as an efficient motor fuel.

It is another object of the invention to provide for the removal of these undesirable compounds by passing the cracked vapors through a body of fuller's earth, or materials having equivalent properties thereto, in such manner as to effect polymerization of the undesirable constituents and their separation from the desirable compounds through such polymerization.

A further object of the invention rests in controlling the reaction temperatures which take place during the polymerization of the undesirable constituents of the oil vapors in the presence of fuller's earth in order to permit of partial condensation of the oil vapor irrespective of the exothermic character of the reactions, to the end of permitting the condensate and the polymers formed to function as a solvent which operates to remove gums and similar tarry coatings from the fuller's earth particles with the end in view of permitting of sustained use on the part of a given body of treating material to maintain the effectiveness and efficiency of the treating operation for prolonged periods of time and to promote generally the economy and utility of the treating operation.

For a further understanding of the invention reference is to be had to the following description and the accompanying drawing, wherein the figure is a diagrammatic view disclosing the apparatus used in attaining the ends of the present invention.

Referring more particularly to the drawing, the numeral 1 designates a furnace or converter through which vaporized mineral oil is passed and subjected to temperatures of the order of 1000° F. or higher. The vapors are mixed with a suitable quantity of steam and are maintained at the cracking temperature specified for a sufficient period of time to secure the desired rate of conversion, whereby hydrocarbon compounds of high boiling range are broken down into compounds of a boiling range substantially equivalent to that of gasolene.

From the converter the oil vapors and steam pass through a discharge line 2 into a fractionating tower 3 wherein there takes place the separation of the compounds of relatively low boiling points from those of higher boiling points, the latter cooling as a liquid in the bottom of the fractionating tower from which they may be withdrawn for any desired use. The oil vapors of low boiling points together with the steam present pass through the fractionating tower, which may be of any standard design, and are removed from the tower by the overhead line 4 and are conducted to a receptacle 5 in which is maintained a bed of a filtering or purifying material 6 of fuller's earth, or other equivalent diatomaceous materials. In this operation the motor fuel vapors accompanied by the fixed gas produced in the cracking operation and the steam which is passed through the converter along with the oil vapors undergoing treatment, are delivered from the top of the fractionating tower at the top of the cylindrical receptacle 5 containing the bed of fuller's earth. These vapors, because of the quantity of steam and fixed gas accompanying them, pass at relatively high velocities through the bed of fuller's earth and are partially purified thereby. The walls of the receptacle 5 are of metal and ordinarily are not insulated against heat losses. Therefore, due to radiation losses from this receptacle and a very small amount of reaction which is permitted, due to the velocity of the vapors, the temperature of said vapors drops somewhat in passing through the tower. In other words, condensation occurs in this fuller's earth tower, which not only embraces the polymerized olefines, but also some of the motor fuel fractions. This condensation is a desirable feature since it keeps the fuller's earth fairly free from depositions of resinous polymerized olefines.

Thus, due to the presence of the steam which takes up a large part by volume of the total quantity of vapors present in the receptacle 5, a sufficiently large body of vapors is provided at all times to maintain a high rate of flow through the filtering material 6. Due to the high velocity of the vapors the polymerization reactions which take place within the receptacle 5 are of a relatively mild character, which prevents large depositions of resinous matter on the fuller's earth particles. This factor, in addition to the condensation of the vapors and the consequent washing action thereof, maintains the fuller's earth in a fresh active state for sustained periods of operation and eliminates the necessity of making frequent substitutions of fuller's earth in the tower. The condensate together with the formed polymers are removed from the tower 5 by way of the pipe line 7 and are transferred to a storage tank 8 for any suitable use.

The vapors remaining in the tower 5 following passage through the bed 6 are removed by way of the pipe line 9 and pass through a cooler 10 wherein they are condensed as far as possible. The fluids then pass by way of a pipe line 11 to a decanter 12, which through differences in specific gravity, operates to separate the fixed gases, the water and the motor fuel distillate. The water is withdrawn from the bottom of the decanter by way of the pipe line 13, while the fixed gas is withdrawn through the top of the decanter through the line 14. This fixed gas is then transmitted to a compressor 15 for the purpose of recovering the liquefiable content present in the fixed gas. The discharge side of the compressor is provided with a pipe line, which leads to a separator 16 which serves to separate the gas remaining after compression from the recovered liquid fraction. The fixed gas finds outlet for any suitable purpose through the line 17, whereas the liquefied fraction may be passed through a line 18 to the discharge line 19 by which the motor fuel distillate is removed from the decanter 12.

This motor fuel distillate is then passed to a vaporizing still 20, or other equivalent form of heat exchanger, wherein said distillate is revaporized and is transmitted to a second clay tower 21. This vapor is now free from fixed gas and water vapor and a portion of the undesirable color and gum forming bodies have been removed therefrom due to the previous treatment in the first tower 5. This vapor is then passed downwardly through the second tower 21 which is similar in construction and operation to the tower 5 and contains a bed of fuller's earth, or other equivalent material 22.

Due to the fact that a part of the diolefines and reactive olefines were removed in the first tower, the polymerizing reactions in the tower 21 are also relatively mild. As a result condensation occurs in this tower also which, as previously explained, is a highly desirable feature in that the condensate is employed as a solvent for washing from the fuller's earth the resinous or gum like bodies which prevent the fuller's earth from maintaining its ordinary effectiveness. The polymerized olefines, accompanied by the condensed motor fuel distillate which separates out in the tower 21, are removed in the same manner as the polymers and condensate from the tower 5 and are delivered by way of the pipe line 23 to the tank 8. The dry vapors pass to a fractionating tower 24 which removes the high boiling point material produced by the polymerization of olefines in the fuller's earth towers and insures the production of a uniform quality of motor fuel. The condensate in the bottom of the fractionating tower may be removed by a pipe line 25, while the vapors pass overhead to a condensate 26 and thence to a storage tank 27 as a finished motor fuel. The distillate entering the tank 27 is characterized by its water-white color, freedom from gums and its ability to retain these properties for prolonged storage periods.

The advantages of this system of treatment are found in the lower cost and the simplicity of operation due to the fact that neither of the fuller's earth towers has very much work to perform. It has been found that very large yields of motor fuel distillate may be obtained per ton of fuller's earth used. This means, of course, that a given charge of fuller's earth will last a very long time, giving continuous operation with a minimum of shut-down time and a minimum clay cost per barrel of finished motor fuel produced.

While I have specifically described my process as using fuller's earth as a catalytic material, yet it is to be understood that I may employ other equivalent solid adsorbtive materials and therefore in the following claims the expressions "catalytic material" and "fuller's earth" are intended to cover all materials of that class which are capable of selectively polymerizing objectionable, unstable and unsaturated constituents of cracked hydrocarbons which tend to discolor on exposure to light or air and to form gum deposits.

What is claimed is:

1. In the treatment of cracked hydrocarbon vapors, the steps which comprise passing a body of cracked hydrocarbon vapors obtained from a cracking zone and without reheating thereof through a bed of fuller's earth at such a rate as to effect partly the polymerization of undesirable compounds present in the vapors, in releasing the heat generated by the exothermic character of the polymerizing reactions with sufficient rapidity to provide for condensation of a portion of the oil vapors while the latter are in contact with the fuller's earth, causing said condensate thus formed to act as a solvent to continuously remove resinous deposits formed as a result of such polymerizing reactions from the fuller's earth, subsequently separating the higher boiling polymerized oils and condensate from the partially treated vapors, condensing said vapors and removing fixed gases therefrom produced in the cracking of the vapors, revaporizing the partially treated oils following such removal of fixed gases, passing the revaporized oils through a second bed of fuller's earth, and controlling the rate of flow of the revaporized oils through the second bed of fuller's earth to secure final polymerization of the undesired compounds present in the last named vapors and their removal as a condensate from the second bed of fuller's earth.

2. In the treatment of cracked hydrocarbon vapors, the steps which comprise passing a body of cracked hydrocarbon vapors obtained from a cracking zone and without reheating thereof through a treating zone, bringing the vapors during their passage through said treating zone into intimate contact with a bed composed of a finely divided solid adsorptive catalyst, removing from one portion of said treating zone as a condensate higher boiling liquid oils containing undesired compounds, removing from another portion of said zone the partially treated vapors, condensing and decanting said vapors to remove therefrom fixed gases produced by the cracking of the vapors, compressing said fixed gases to strip the latter of their more readily liquefiable constituents, admixing such liquefiable constituents with the condensed oils and subjecting the latter oils to heat to effect their revaporization, then passing said revaporized oils through a second treating zone, and bringing the revaporized oils while in said second treating zone into contact with a second body of the aforesaid catalyst, whereby to secure final polymerization of the undesirable compounds present in said vapors.

3. In the treatment of cracked hydrocarbon vapors, the steps which comprise passing a stream composed of cracked hydrocarbon vapors admixed with steam obtained from a cracking zone and without reheating thereof through a treating zone containing a finely divided solid adsorptive catalyst, removing from one portion of said zone undesirable higher boiling compounds as a condensate or liquid, removing from another portion of said treating zone the partially treated cracked vapors and steam, condensing said mixture of vapors and steam and decanting the same to effect the removal of fixed gas formed by the cracking of the vapors and steam from the partially treated oil, subjecting such fixed gas to compression to strip therefrom its more readily liquefiable constituents, returning said last named constituents to the partially treated oil and reheating the resulting mixture to vaporize the same, passing such resulting vapors through a second treating zone containing a second body of the aforesaid catalyst, removing from one portion of said second named treating zone undesired compounds in the form of a condensate, and removing from another portion of said treating zone the finally treated vapors, and condensing and collecting said latter vapors.

In testimony whereof I affix my signature.

CORNELIUS B. WATSON.